No. 710,351. Patented Sept. 30, 1902.
M. B. BROOKS.
APPLE PARER.
(Application filed May 22, 1902.)
(No Model.) 3 Sheets—Sheet 1.
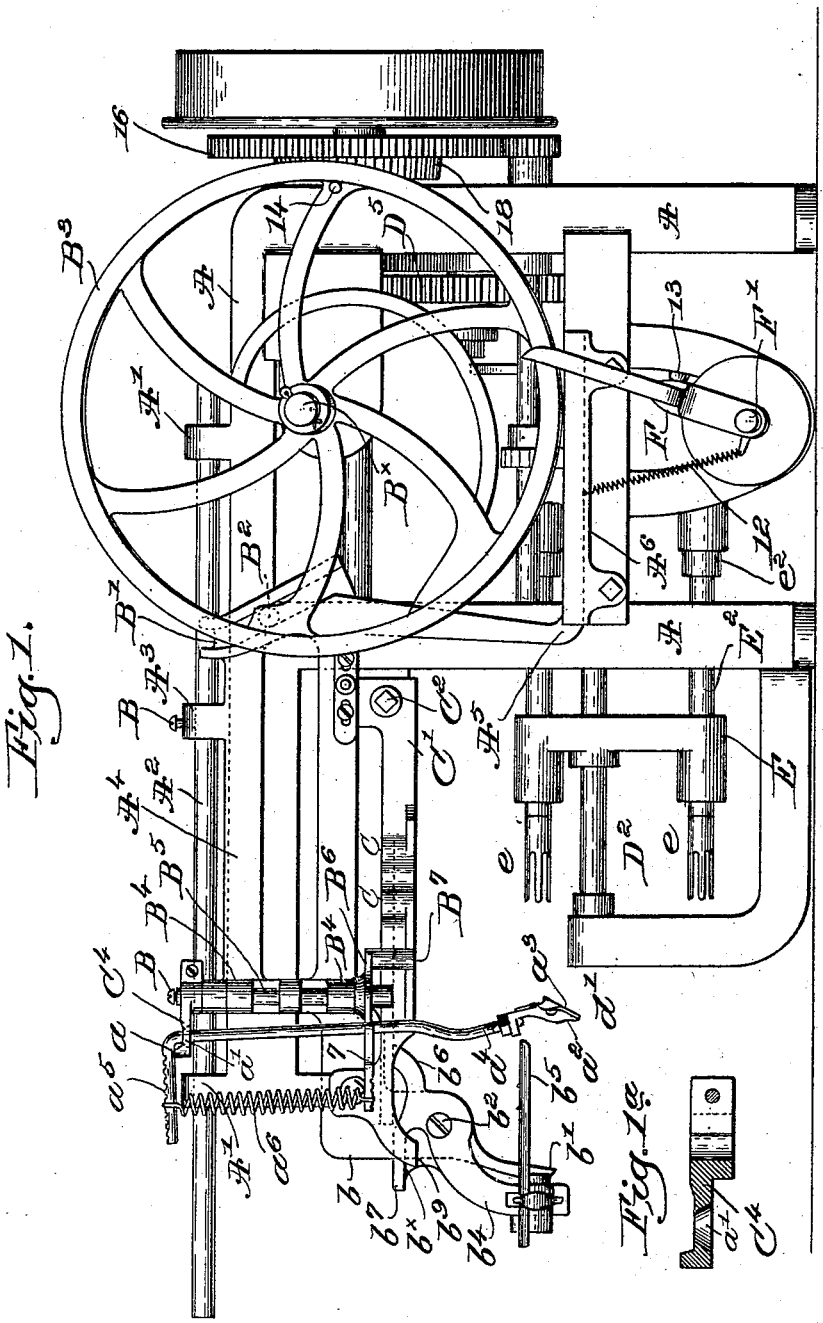
Witnesses.
Thomas J. Drummond
Herman J. Sartoris
Inventor.
Myron B. Brooks,
by Crosby Gregory
Attys.

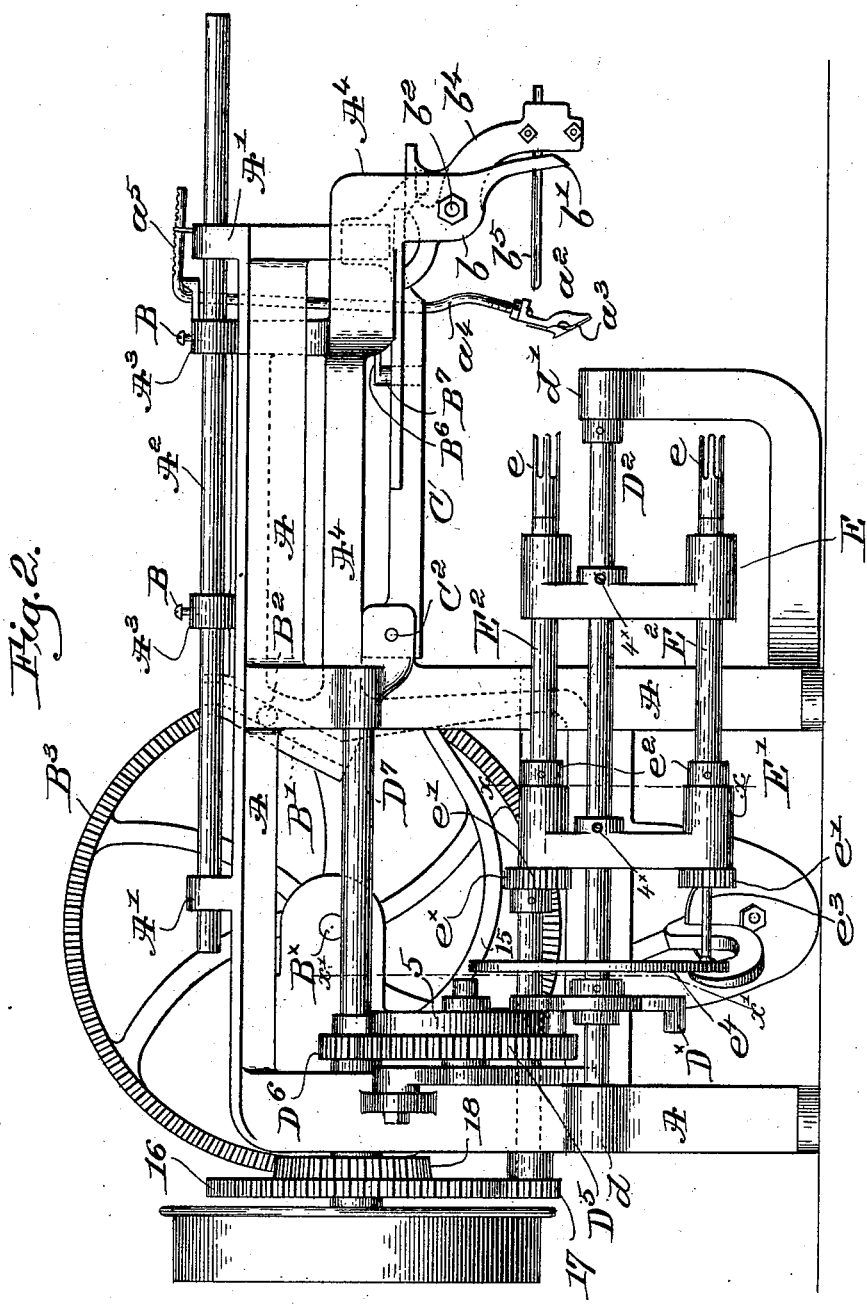

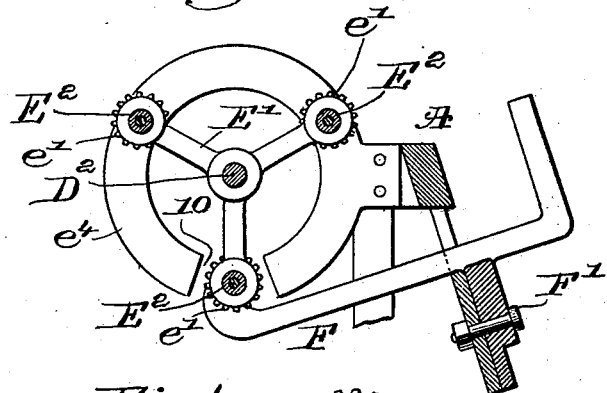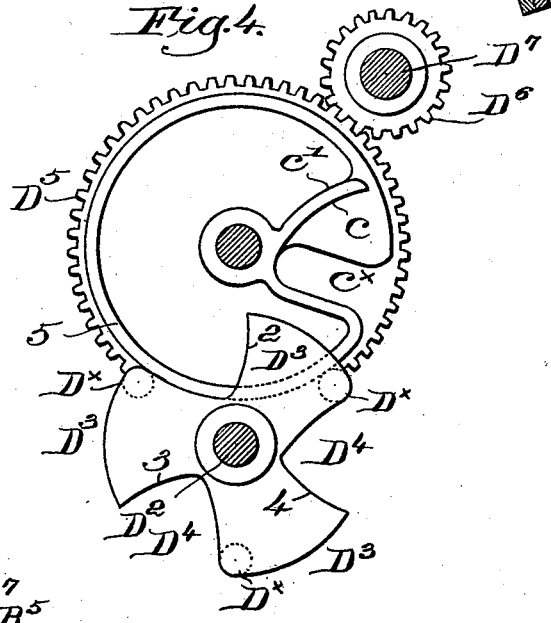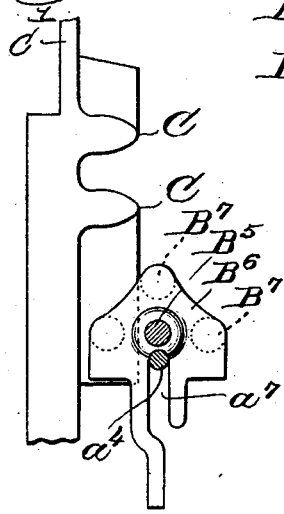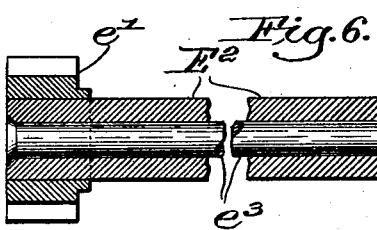

UNITED STATES PATENT OFFICE.

MYRON B. BROOKS, OF NASHVILLE, MICHIGAN, ASSIGNOR TO GOODELL COMPANY, OF ANTRIM, NEW HAMPSHIRE.

APPLE-PARER.

SPECIFICATION forming part of Letters Patent No. 710,351, dated September 30, 1902.

Application filed May 22, 1902. Serial No. 108,510. (No model.)

*To all whom it may concern:*

Be it known that I, MYRON B. BROOKS, a citizen of the United States, residing at Nashville, in the county of Barry and State of Michigan, have invented an Improvement in Apple-Parers, of which the following description, in connection with the accompanying drawings, is a specification, like characters on the drawings representing like parts.

This invention has for its object the production of a novel apple-parer using a plurality of forks that are moved to place the apples carried thereby in position to be pared, the machine having coring mechanism and means to discharge the core from the fork after the apple has been removed by the coring device.

Figure 1 is a right-hand side elevation of an apple-parer embodying my invention; Fig. 1$^a$, an enlarged view of the arm $C^4$. Fig. 2 is a left-hand side view of the machine shown in Fig. 1; Fig. 3, a section in the line $x$, Fig. 2; Fig. 4, a section in the line $x'$, Fig. 2; Fig. 5, a detail to be referred to, and Fig. 6 shows a longitudinal section of the fork-spindle broken out.

The framework A of the machine is of suitable shape to sustain the working parts. The upper part of the framework has bosses $A'$, in which slides the rod $A^2$, that actuates the paring and coring mechanism to be described. The rod $A^2$ has secured to it by a set-screw B an ear $A^3$, extended from a carriage $A^4$, having a foot $A^5$, that travels in a guideway behind a bar $A^6$. The carriage $A^4$ has a cam-slot $B'$, the lower end of which is entered intermittingly by a pin $B^2$, carried by a toothed drive-wheel $B^3$, mounted on a stud $B^\times$, said pin reciprocating said carriage, the carriage moving first inwardly and then outwardly. The carriage has projecting ears $B^4$, that receive loosely a rock-shaft $B^5$, having secured to its lower end a turn-table $B^6$, having suitable projections $B^7$, that as the carriage is slid engage suitable teeth C of a bar $C'$, secured by a bolt $C^2$ to the frame, said teeth causing the turn-table to be turned in one and then in an opposite direction. The rock-shaft $B^5$ has an arm $C^4$ clamped to its upper end, said arm having at its extremity a fulcrum $a$, and near said fulcrum said arm has a tapering hole $a'$. The knife-head $a^2$, provided with the usual knife $a^3$, is secured to the lower end of an L-shaped rod $a^4$, the horizontal end of which is notched, as at $a^5$, to receive a spring $a^6$, the lower end of which engages suitable notches of an extension 7 of the turn-table. The arm $a^4$ is sustained so that it may rock on the fulcrum $a$ in the tapered hole $a'$, and the arm, between its fulcrum and the knife-head, is free to be moved to and fro in a slot $a^7$ (see Fig. 5) cut in the turn-table, the spring $a^6$ acting normally to keep the arm seated in the end of the slot, the arm moving outwardly in said slot to adapt it to the size of the apple being cut.

The carriage $A^4$ has depending from its outer end a lug $b$, the lower end of which is shaped to constitute a doffer $b'$, and said arm sustains a stud $b^2$, that constitutes a fulcrum for the carrier $b^4$, that sustains the corer $b^5$. The upper end of the carrier has two projections $b^6 b^7$, said projections contacting with the under side of the bar $c$ during the inward and outward movements of the carriage while the corer is acting to enter the apple, and while the corer sustaining the apple is being withdrawn from the fork a recess $b^\times$ in the carrier is entered by a stud $b^9$, fixed to the framework, said stud entering said recess and tipping the carrier as the carriage is moving into its farthest outward position, thus causing the corer to occupy an inclined position and force the apple thereon against the doffer, thus providing for the discharge of the cored apple from the corer.

The machine herein described is adapted to sustain a plurality of apples. The framework has suitable bearings $d$ and $d'$, that sustain a rotary shaft $D^2$, provided near one end with a star-wheel $D^3$, having, as shown, three like studs $D^\times$, extended from three like projections left by the formation of three recesses $D^4$. The star-wheel and shaft $D^2$ are moved intermittingly by a gear $D^5$, moved continuously by a pinion $D^6$, fast on the main shaft $D^7$, said shaft being actuated in any usual manner by means of a belt on a pulley surrounding said shaft, either a clutch-pulley or any other usual or suitable driving means. The gear $D^5$ is provided with a notch $c^\times$ and a projection $c$, having a cam-surface $c'$, that is represented as somewhat convexed, this surface in the rotation of the gear in the direction of the arrow thereon meeting one after the other the projections $D^\times$ and the working surfaces 2 3 4 of the star-wheel $D^3$ and starting the same and the shaft $D^2$ in motion. The surface $c'$ commences to act on the surfaces 2 3 4 of the star-wheel near their ends and finishes its action on said surfaces near the bottoms of the notches, and as the surface $c'$ completes its action on the surfaces 2 3 4 the projections $D^\times$ enter the slot $c^\times$, and thereafter the slot in the rotation of the wheel $D^5$ turns the shaft $D^2$. Owing to the peculiar construction of the surface $c'$ of the slot and the working faces 2 3 4 of the wheel $D^3$, it is possible to rotate the shaft $D^2$ at a variable speed, it starting slowly from a position of rest, and during the first third of each movement the speed of the shaft gradually increases until one of the projections $D^\times$ enters the cam-slot $c^\times$, and thereafter the speed of the shaft is about the same as when the surface $c'$ ceases to act. A slow starting of the shaft and the parts, to be described, carried by it adds very materially to the stability of the machine, for the parts carried by said shaft are quite heavy and if the movement is quick are liable to be strained out of working position and the parts broken.

The shaft $D^2$ has secured adjustably to it by suitable set-screws $4^\times$ two spiders E E', each a counterpart of the other, each spider presenting, as herein represented, three arms having hubs bored in alinement with the shaft for the reception of a plurality of fork-spindles $E^2$, each spindle being represented as a tube and having secured to its outer end a like fork $e$, the inner end of each spindle having a pinion $e'$, each spindle having a collar $e^2$, that coacts with one of the spiders, as E', to limit the outward movement of the fork-spindle. By employing two of these spiders they may be adjusted at suitable distances apart to constitute two bearings for each fork-spindle, and owing to the capability of adjusting the spiders about the shaft $D^2$ it is possible to exactly aline the longitudinal centers of the fork-spindles with the longitudinal center of the shaft $D^2$. Each fork-spindle receives in it a core-discharger $e^3$. As the apples are shoved on the forks in succession, this being done, preferably, while the shaft $D^2$ is at rest, the apples acting on the core-discharger push the rear end of said discharger outwardly against a curved stop-plate $e^4$, (see Fig. 3,) that embraces the shaft $D^2$, said stop-plate being secured in suitable manner to the framework. The stop-plate has a suitable recess, as 10, in which normally rests a device F, represented as a lever pivoted at F', that is held normally by a suitable spring 12 against a stop 13, fixed with relation to the framework. In the rotation of the wheel B a stud 14 at the outer face thereof acts against the upper end of the arm and moves the device F in a direction to act upon the outer end of the core-remover then opposite the space 10 and move said remover longitudinally in the spindle and cause the outer end of the core-remover to act upon the core in the fork and push the core from the fork, this being done while the shaft and the spindles are substantially stationary and about as the apple on another fork is being pared and the corer is entering the apple being pared.

The wheel $D^5$ has an outwardly-projecting flange 5, against which the projections $D^\times$ act after leaving the slot $c^\times$, and while each projection rests on the outer face of said flange the shaft $D^2$ is at rest, and during this time a suitable gear $e^\times$ on a driven shaft 15 engages one or the other of the pinions $e'$ at the end of a fork-spindle and rotates it, so that the apple on the fork being rotated is moved with relation to the parer that the latter may core the apple. The shaft 15 moves at a faster speed than the shaft $D^7$, the shaft 15 deriving its movement constantly from a large gear 16 on the shaft $D^7$, said large gear engaging a pinion 17 at the end of the shaft 15. The shaft $D^7$ has a smaller bevel-gear 18, that engages the teeth of the gear $B^3$, employed to actuate the carriage.

Having described my invention, what I claim, and desire to secure by Letters Patent, is—

1. In an apple-parer, a paring-blade, a carriage to sustain said blade, means to move said carriage, a plurality of fork-spindles each provided with a core-discharger, a stop-plate having an open space, said plate arresting the core-dischargers in the position where left by the application of an apple to a fork, a lever, and means to move said lever that its free end may pass through said space and meet and move forward each core-discharger independently to thereby discharge the cores from each fork in succession.

2. In an apple-parer, a shaft, bearings for each end of said shaft, a plurality of spiders adjustably secured to said shaft at a distance apart between said shaft-bearings, each spider having a plurality of bearings, a plurality of fork-carrying spindles sustained in the bearings of said spiders, means to rotate the spider-carrying shaft intermittingly at a varying speed, said means comprising a continuously-rotatable pinion, a gear having a cam-surface and a star-wheel having curved faces, and means to rotate said fork-spindles one after the other while said shaft is at rest and while the paring mechanism is acting to pare an apple.

3. In an apple-parer, a shaft having a connected notched wheel provided with a plurality of projections, each notch having an acting surface, combined with a continuously-rotating wheel having an outwardly-projecting flange, a slot at the end of said flange, and a convexed working surface at a distance from said slot, said working surface in the rotation of the wheel acting first upon one or the other of the faces of the notched wheel starting the shaft slowly, the slot finally embracing a projection of said wheel and completing the movement of the shaft, the projection thereafter being acted upon by the faces of the flange whereby the shaft carrying the fork-spindles may be rotated intermittingly and started slowly to thus avoid shock and strain of the machine.

In testimony whereof I have signed my name to this specification in the presence of two subscribing witnesses.

MYRON B. BROOKS.

Witnesses:
W. I. MARBLE,
THEOD. C. DOWNING.